No. 878,072. PATENTED FEB. 4, 1908.
J. W. LAMBERT.
TRANSMISSION GEAR FOR AUTOMOBILES.
APPLICATION FILED JAN. 26, 1907.
4 SHEETS—SHEET 1.
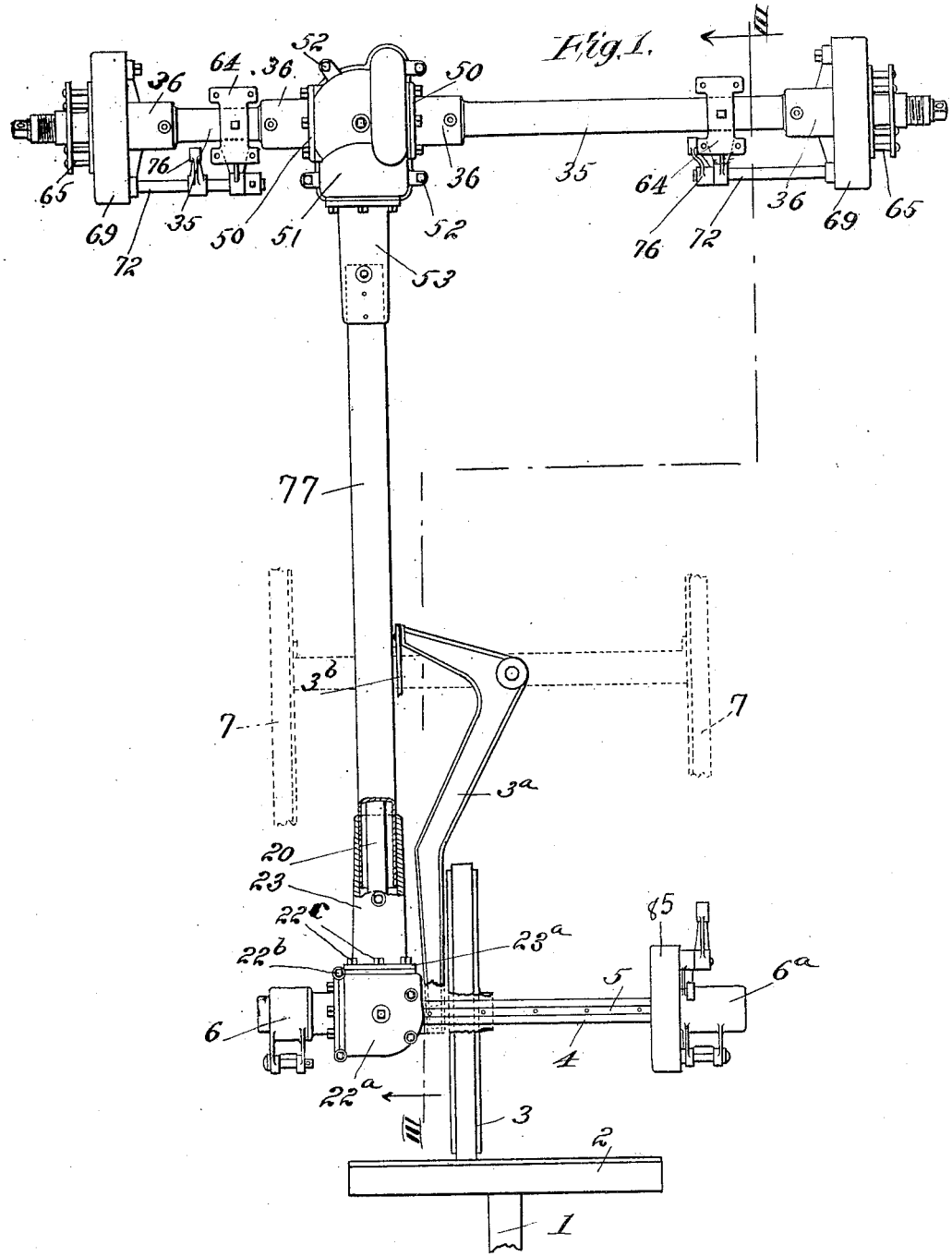

No. 878,072. PATENTED FEB. 4, 1908.
J. W. LAMBERT.
TRANSMISSION GEAR FOR AUTOMOBILES.
APPLICATION FILED JAN. 26, 1907.
4 SHEETS—SHEET 2.
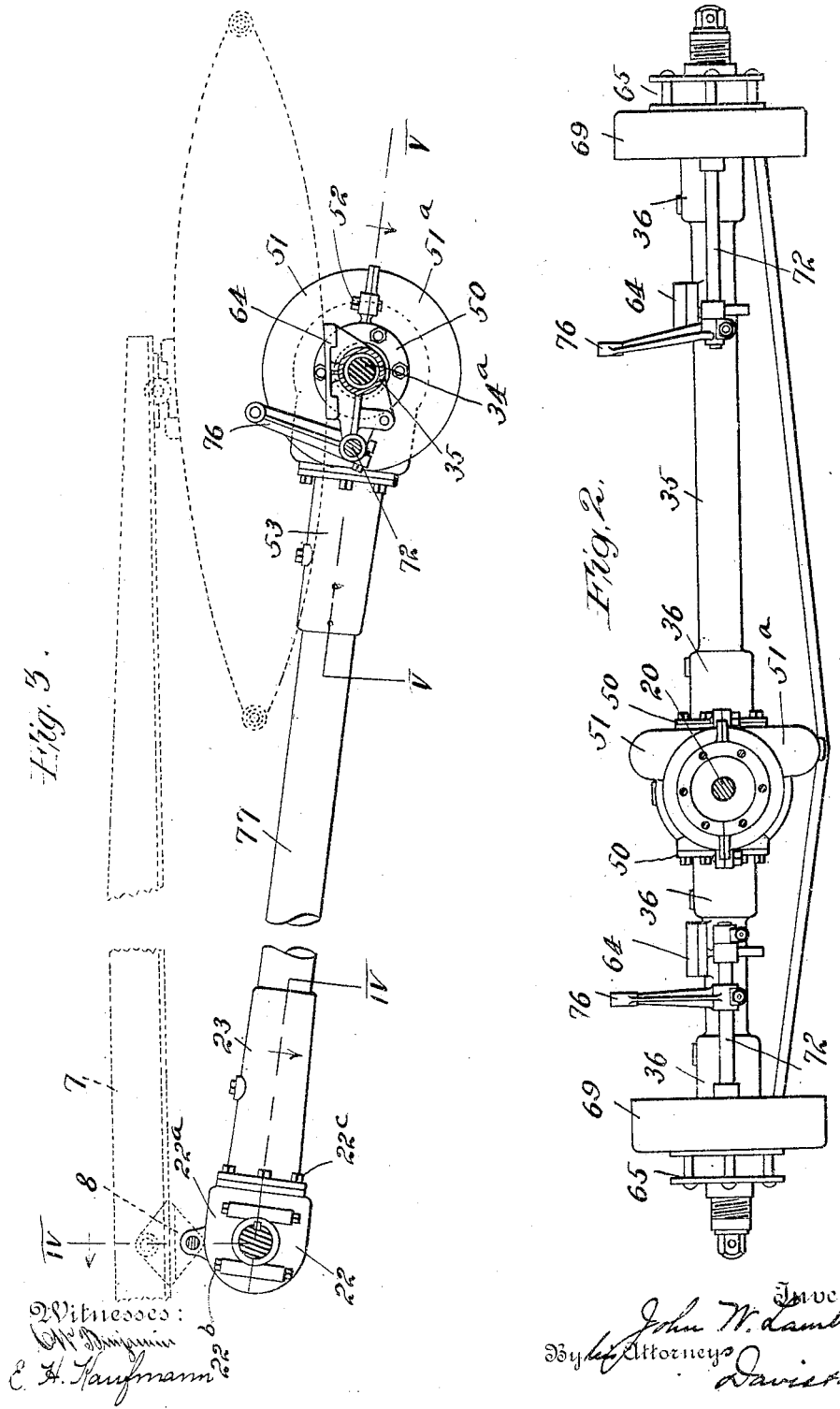

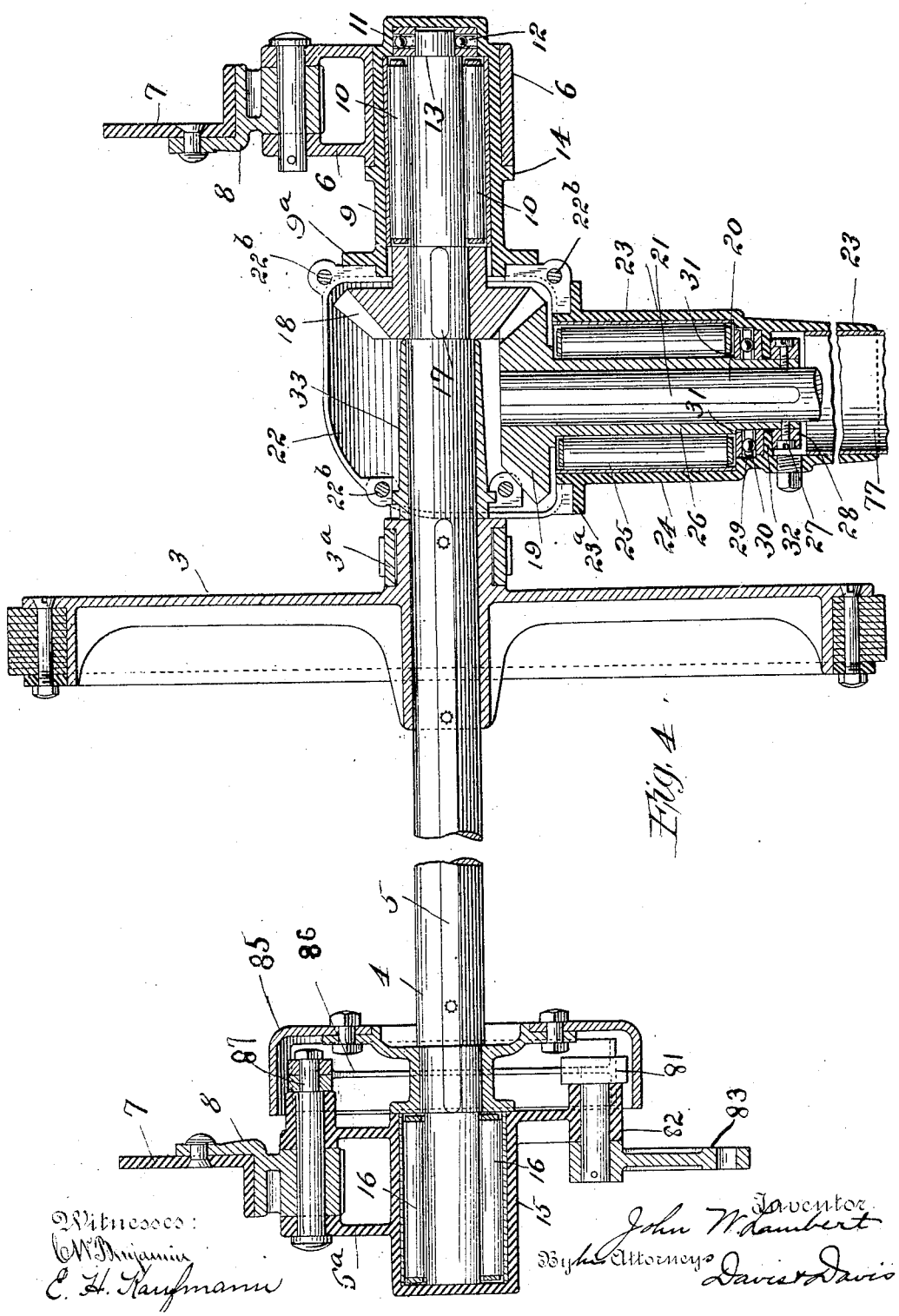

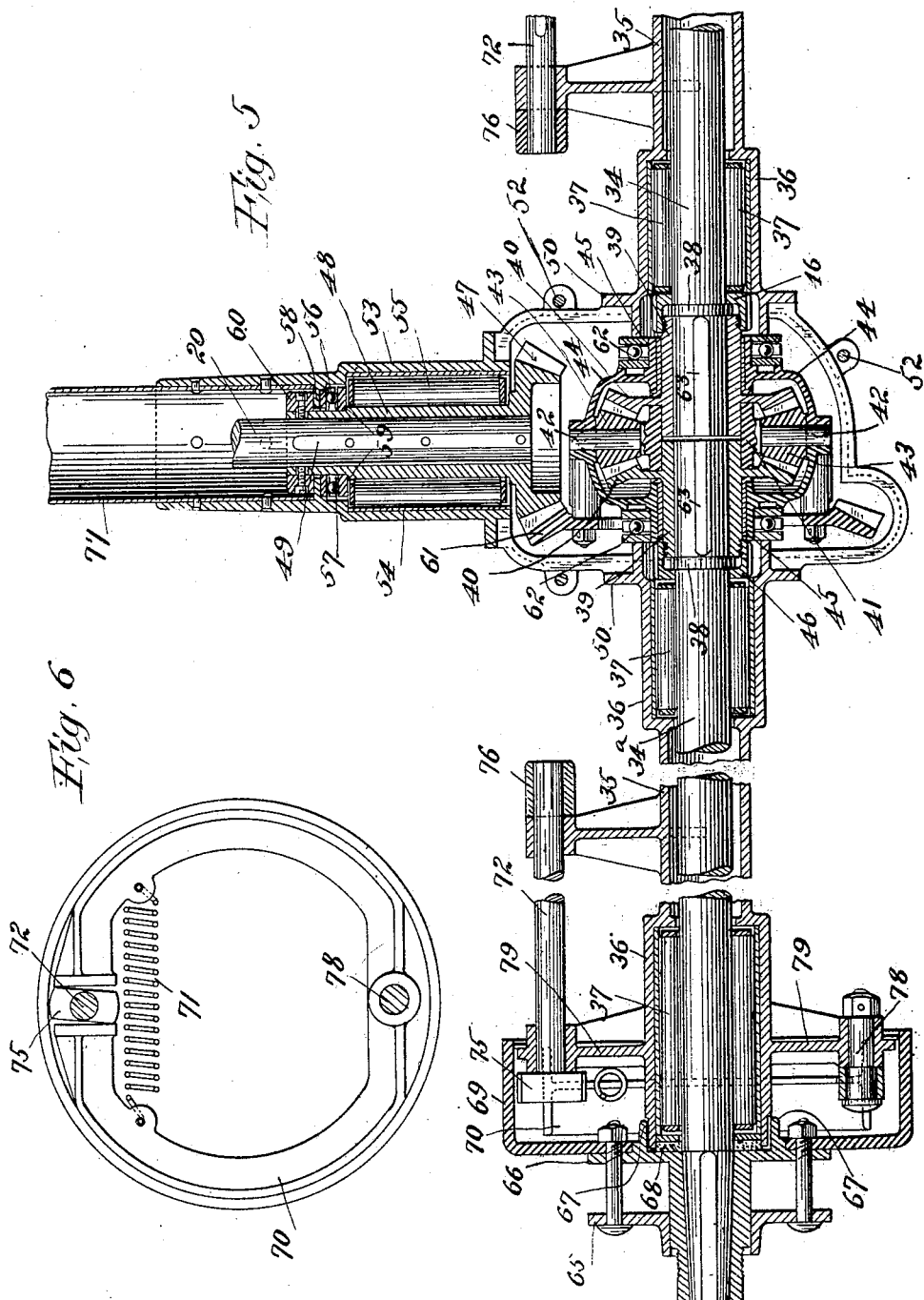

UNITED STATES PATENT OFFICE.

JOHN W. LAMBERT, OF ANDERSON, INDIANA, ASSIGNOR TO THE BUCKEYE MANUFACTURING COMPANY, OF ANDERSON, INDIANA, A CORPORATION OF INDIANA.

TRANSMISSION-GEAR FOR AUTOMOBILES.

No. 878,072.

Specification of Letters Patent.

Patented Feb. 4, 1908.

Application filed January 26, 1907. Serial No. 354,173.

*To all whom it may concern:*

Be it known that I, JOHN W. LAMBERT, a citizen of the United States, residing at Anderson, county of Madison, and State of Indiana, have invented certain new and useful Improvements in Transmission-Gears for Automobiles, of which the following is a specification, reference being had therein to the accompanying drawings, in which—

Figure 1 is a plan view of the apparatus; Fig. 2 a front view of the rear axle and its inclosing casing; Fig. 3 a longitudinal vertical sectional view on the line III—III of Fig. 1; Fig. 4 transverse sectional view of the cross-shaft on the line IV—IV of Fig. 3; Fig. 5 a horizontal sectional view of the rear axle and its inclosing casing substantially on the line V—V of Fig. 3, the axle and its inclosing casing being broken to shorten the view; and Fig. 6 a detail side elevation of one of the expansion hub brakes.

This invention relates to improvements in friction driving mechanisms for automobiles and has for one of its objects to provide improved means for transmitting motion from the shaft of the driven friction disk to the rear axle.

A further object of the invention is to provide a gear transmission connecting the shaft of the driven friction disk to the rear axle of the automobile, thereby doing away with the sprocket chain and sprocket wheels heretofore used for this purpose, said mechanism being so constructed that the shaft of the friction disk may have sufficient forward and rearward motion in its hangers to permit it to be brought into engagement with the driving disk and released therefrom without effecting the operation of the transmission gears.

A further object of the invention is to provide a dust proof casing for the entire transmission mechanism.

Other objects of the invention relating particularly to details of construction will appear hereinafter.

Referring to the various parts by numerals, 1 designates the engine shaft, 2 the driving friction disk mounted thereon, 3 the driven friction disk which is carried by the cross-shaft 4. The hub of the friction driven disk is formed with a slot or key-way (not shown) to receive the longitudinal rib 5 on the shaft 4. This shaft 4 is suspended in pivoted hangers 6 and 6ª which are mounted on the main frame 7 of the machine, depending brackets 8 being provided to receive the pivots of said hangers. The cross-shaft 4 is swung to and from the driving friction disk by any suitable means, for example, such as that shown in my Patent #807,623 of December 19, 1905. The driven friction disk is moved along its shaft by means of a lever 3ª to which is connected the operating rod 3ᵇ, the forward end of said rod being connected to any suitable form of operating means (not shown). In hanger 6 is mounted a tubular box 9 which is closed at its outer end and is adapted to contain a series of long rollers 10 which form a roller bearing for one end of the shaft 4. This box is formed with a reduced part 11 at its outer end which is adapted to contain a ball thrust bearing 12; and the end of the shaft 4 is reduced to form the shoulder 13 which is adapted to engage said thrust bearing, as shown in Fig. 4. The tubular box 9 is formed with an exterior annular shoulder 14 which engages the inner side of the hanger 6 and holds said tubular box against outward movement through said hanger. The hanger 6ª is formed with a tubular box 15 adapted to receive long rollers 16 which form a roller bearing for the other end of the shaft 4.

Secured to the shaft 4 by means of a rib 17 is a beveled gear 18. Meshing with said beveled gear is a similar gear 19 rigidly secured to the forward end of a longitudinal shaft 20, said shaft being provided with a rib 21 which is adapted to fit in a corresponding groove in gear 19, said groove not being shown in the drawing. The tubular box 9 is provided at its inner end with an annular radial flange 9ª to which the lower half 22 of a gear casing is bolted. The upper part 22ª of said casing is also bolted to the flange 9ª; and is bolted to the lower part 22 by bolts 22ᵇ. Bolted to the rear side of this gear case is a rearward extending tubular shaft support 23 which surrounds the forward end of shaft 20, said shaft support being formed with a radial flange 23ª by which it is connected to the gear case by means of bolts 22ᶜ. This shaft support is formed with a chamber 24 to receive long rollers 25 which form a roller bearing for said shaft. The gear 19 is formed with a long hub 26 which is adapted to bear on said roller 25, said hub being rigidly secured to the shaft against longitudinal movement by means of the screws 27 and the collar 28, as shown clearly in Fig. 4 of the drawings. The shaft support 23 is formed with a reduced chamber 29 in which is arranged a ball thrust bearing 30; and the hub 26 of the gear 19 is formed with a shoulder 31 which is adapted to engage said thrust bearing. Said thrust bearing is held against rearward movement by an annular wall 32, which forms the rear wall of the chamber 29. The collar 28 eats against the rear side of this wall 32 and b assists in holding the gear-wheel against forward movement on the shaft 20. Within the gear case is arranged a shaft protecting tube 33, the end of said tube closing the inner side of the gear casing 22 and forming a dust proof cover for the shaft. It will be noted that the gears and the adjoining parts of the shafts will be thoroughly protected, and that dust and moisture will be excluded therefrom.

The rear axle is formed in two parts or sections 34 and 34ª, the meeting ends of said sections being axially in line with the longitudinal center of the shaft 20. The sections 34 and 34ª of the said rear axle are each mounted within a tubular casing 35 formed with the enlarged chambers 36 near its ends, said chambers being adapted to receive long rollers 37 which form bearings for the inclosed section of the axle near each end of said axle section. Each axle section is formed near its inner end with an annular shoulder or collar 38; and mounted on each axle section between said collar and the end of the section is the hub 39 of a beveled gear 40, said gears facing each other, as shown in Fig. 5. On the hubs of these beveled gears, and bridging the joint between the axle sections, is a sleeve 41; and said sleeve carries radial pins 42 which are arranged diametrically opposite each other. These pins carry pinions 43 which mesh with the axle gears 40. The outer ends of the pins 42 are mounted in a yoke 44 which is formed with the bearings 45 rotatable on the hubs 39 of the beveled gears 40. The hubs 39 are held close to the collars 38 by means of flanged screw-caps 46 which embrace said collars and are threaded on the ends of said hubs.

The rear end of the shaft 20 carries a beveled gear 47. This gear is formed with a long hub 48 which closely fits the shaft 20 and is in sliding engagement therewith. The shaft 20 at its rear end is provided with the longitudinal rib 49 which fits a corresponding groove in the rib of the gear 47, said rib being in sliding engagement with said groove. The object of mounting the shaft 20 in sliding engagement with the gear 47 is to permit said shaft to move forward and rearward slightly when the driven friction disk 3 is moved to and from the driving friction disk 2. This is a very important feature of my invention.

The inner ends of the casings 35 are each formed with an annular radial flange 50 to which are bolted the upper and lower sections 51 and 51ª of a gear casing which incloses the gears connecting the shaft 20 with the sections of the rear axle, said sections of the gear casing being bolted together by vertical bolts 52. To the forward end of this gear casing and surrounding the shaft 20, is a tubular shaft support 53 which is formed with the enlarged chamber 54 to receive the long rollers 55 which form roller-bearings for the hub 48 of the gear 47. The shaft support 53 is formed with a chamber 56 adapted to receive a ball thrust bearing 57, the shaft support being formed with an inwardly extending flange 58 to hold said thrust bearing against forward movement; and the hub 48 being formed with a shoulder 59 to bring the forward thrust of the gear 47 on said thrust bearing. A collar 60 is connected to the forward end of the hub 48 and is adapted to bear against the forward side of the flange 58 to hold the hub and the gear 47 in a fixed relation with respect to the shaft support 53 and the gear casing 51.

The gear 47 meshes with a large beveled gear 61 held by the yoke 44 within the gear casing. Between the ends of the yoke 44 and the inner ends of the casings 35, suitable thrust bearings 62 are mounted, these bearings also taking the thrust of the gear 40. The gears 40 are rigidly connected to the ends of their respective shafts by means of ribs 63 which fit corresponding grooves in the hubs of said gears.

To each casing 35 is rigidly secured an upward extending spring support 64 adapted to receive the lower leaf of the elliptical springs, as indicated in dotted lines in Fig. 3, said springs being adapted to support the rear end of the vehicle body.

The wheel hubs 65 are secured to the outer ends of the sections of the rear axle in any suitable manner, the inner plate 66 thereof being formed with the inward extending annular flange 67 which fits around the adjoining end of the inclosing casing 35. Within the ends of these sections 35 are secured dust excluding washers of metal and felt as shown at 68 in Fig. 5. Secured to the inner plate of each of the wheel hubs is a brake-drum 69 within which is mounted the expanding brake 70. The brake shoes are pivoted at 78 in an annular flange 79 formed on each section 35, said flanges closing the inner ends of the brake-drums and excluding dust and dirt therefrom. These brake shoes are held in their normal, released position by a spring 71, as shown in Fig. 6. Mounted in bearings rigidly connected to the casing 35 are rock-shafts 72 the outer ends of said shafts extending into the adjoining brake drum and carrying an expander 75 which fits between the free ends of the shoes of the brake. Secured to each of said rock-shafts is an operating arm 76 to which a suitable operating rod may be connected, whereby on the movement of said rod in the proper direction the expander will be rotated and the brake shoes caused to frictionally engage the inner surface of the brake drum.

Rigidly secured to the forward end of the shaft support 53 is a protecting tube 77, the rear end of said protecting tube fitting within the shaft support 53 and preferably being secured thereto by pivots. The forward end of this protecting tube fits closely within the rear end of the shaft support 23 and is in sliding engagement therewith. This is an important feature of my invention. It will be noted that when the shaft 4 and the driven friction disk 5 are moved forward or rearward to engage or disengage the driven friction disk and the driving friction disk, the rear end of the shaft 20 will slide through the hub of the beveled gear 47, and the forward end of the protecting tube 77 will slide back and forth in the rear end of the shaft support 23. By this means the sliding joint between the gear and the shaft 20 will be supported and protected in the shaft support which is rigidly connected to the protecting tube, and the sliding joint between the protecting tube and the shaft support will be at that point in the shaft which is supported by and rigidly connected to the beveled gear 19. This arrangement is of importance in securing strength, and also in excluding dust from the working parts thereof.

The brake drum 85 is secured to the cross shaft and the brake shoes 86 are pivoted at 87, which is also the pivot of the hanger 6ª. The expander 81 is pivoted in a depending part 82 of the hanger 6ª; and 83 is the projecting arm for said expander.

From the foregoing it will be seen that I provide an efficient shaft driving mechanism by which the cross shaft carrying the driven friction disk may be connected to the sections of the rear axle, and the entire driving mechanism inclosed within dust proof casings. It will also be noted that I provide a new and desirable construction of the rear axle, and differential gearing, said differential gearing comprising the gears 40 the pinions 43 and the main gear 61.

Having thus described my invention, what I claim as new and desire to secure by Letters Patent, is:—

1. A driving mechanism comprising a driving friction disk, a driven friction disk, a shaft carrying the driven friction disk, means for mounting said shaft to permit it to have a backward and forward movement, a beveled gear carried by said shaft, a longitudinal shaft, a gear carried by said longitudinal shaft meshing with the gear on the shaft of the driven disk, a rear axle, gears connecting the rear end of the longitudinal shaft with the rear axle, and means whereby the shaft of the driven friction disk may be moved backward and forward without moving the gear carried by said shaft away from the gear carried by the longitudinal shaft.

2. A driving mechanism comprising a driving friction disk, a driven friction disk, a shaft for said driven disk adapted to be moved toward and from the driving disk, a rear axle, a longitudinal shaft, a gear driving means connecting the shaft of the driven disk with said longitudinal shaft, and said longitudinal shaft with the rear axle, and means for permitting said shaft of the driven disk to be moved toward and from the driving disk without changing the relation of the gears in the gear driving means.

3. A driving means comprising a driving disk, a driven disk, a shaft for said driven disk movable toward and from the driving disk, a rear axle, a longitudinal shaft, gears connecting said shaft with the rear axle, gears connecting said longitudinal shaft with the shaft of the driven disk, one end of said longitudinal shaft being rigidly connected to its gearing, the other end thereof being slidingly connected thereto.

4. A driving mechanism comprising a driving disk, a driven disk, a shaft for said driven disk adapted to be moved toward and from the driving disk, a longitudinal shaft, gears connecting said shaft to the shaft of the driven disk, said longitudinal shaft being rigidly connected to one of said gears, a two-part rear axle, differential gearing connecting the two parts of said axle, a gear slidingly engaging the rear end of the longitudinal shaft, and means connecting said gear to the differential gearing on the rear axle.

5. A driving mechanism comprising a driving disk, a driven disk, a shaft for said driven disk, swinging bearings for said shaft, a tubular bearing box mounted in one of said swinging bearings, a gear case connected to said bearing box, a beveled gear on said shaft within said gear case, a rearwardly extending shaft support carried by said gear case, a longitudinally extending shaft mounted in said shaft support, a gear rigidly secured to said shaft and meshing with the beveled gear on the shaft of the driven disk, a thrust bearing within said shaft support and adapted to take the rearward thrust of said beveled gear, a two-part rear axle, differential gearing connecting the parts of said rear axle, a gear on the rear end of the longitudinal shaft and in sliding engagement therewith, a support for said shaft at the rear end thereof, said gear meshing with and operating the differential gearing on the rear axle.

6. A driving mechanism comprising a driving disk, a driven disk, a shaft for said driven disk, swinging bearings for said shaft, a tubular bearing box mounted in one of said swinging bearings, a gear case connected to said bearing box, a beveled gear on said shaft within said gear case, a rearwardly extending shaft support carried by said gear case, a longitudinally extending shaft mounted in said shaft support, a gear rigidly secured to said shaft and meshing with the beveled gear on the shaft of the driven disk, a thrust bearing within said shaft support and adapted to take the rearward thrust of said beveled gear, a two-part rear axle, differential gearing connecting the parts of the said axle, a gear on the rear end of the longitudinal shaft and in sliding engagement therewith, a support for said shaft at the rear end thereof, said gear meshing with and operating the differential gearing on the rear axle, and a protecting tube surrounding the longitudinal shaft and slidingly engaging one of the shaft supports.

7. A driving mechanism comprising a driving disk, a driven disk, a shaft for the driven disk movable toward and from the driving disk, a longitudinally extending shaft, gears connecting said shaft to the shaft of the driven disk, a rigidly supported gear casing inclosing said gear, a shaft support rigidly connected to said gear casing, roller bearings for said shaft mounted in said support and adapted to be engaged by the hub of the gear on said shaft, a ball thrust bearing in said shaft support and adapted to take the rearward thrust of said gear, a two-part rear axle, differential gearing connecting said parts, a gear on the rear end of the longitudinal shaft adapted to drive the differential gearing, said gear having a sliding engagement with said shaft.

8. A driving mechanism comprising a driving disk, a driven disk, a shaft for the driven disk movable toward and from the driving disk, a longitudinally extending shaft, gears connecting said shaft to the shaft of the driven disk, a rigidly supported gear casing inclosing said gears, a shaft support rigidly connected to said gear casing, roller bearings for said shaft mounted in said shaft support and adapted to be engaged by the hub of the gear on said shaft, a ball thrust bearing in said shaft support and adapted to take the rearward thrust of said gear, a two-part rear axle, differential gearing connecting said parts, a gear on the rear end of the longitudinal shaft adapted to drive the differential gearing, said gear having a sliding engagement with said shaft, a support for the rear end of the longitudinal shaft, a roller bearing therein adapted to engage the hub of the gear secured to said shaft and a ball thrust bearing within said shaft support and adapted to take the forward thrust of said gear.

9. A driving mechanism comprising a driving disk, a driven disk, a shaft for the driven disk movable toward and from the driving disk, a longitudinally extending shaft, gears connecting said shaft to the shaft of the driven disk, a rigidly supported gear casing inclosing said gears, a shaft support rigidly connected to said gear casing, roller bearings for said shaft mounted in said shaft support and adapted to be engaged by the hub of the gear on said shaft, a ball thrust bearing in said shaft support and adapted to take the rearward thrust of said gear, a two-part rear axle, differential gearing connecting said parts, a gear on the rear end of the longitudinal shaft adapted to drive the differential gearing, said gear having a sliding engagement with said shaft, a support for the rear end of the longitudinal shaft, a roller bearing therein adapted to engage the hub of the gear secured to said shaft, a ball thrust bearing within said shaft support and adapted to take the forward thrust of said gear, and a protecting tube surrounding the longitudinal shaft and rigidly connected to the rear support of said shaft and slidingly engaging the forward support of said shaft.

10. A driving mechanism comprising a driving disk, a driven disk, a shaft therefor movable toward and from the driving disk, a longitudinal shaft, gears connecting said shaft to the shaft of the driven disk, said longitudinal shaft being rigidly connected to one of said gears, a gear on the rear end of said longitudinal shaft and in sliding engagement therewith, a two-part rear axle, a gear on the inner end of each part of said axle, a rigid collar formed on each end of said shafts, a retaining-cap fitting over said collar and connected to the adjoining gear whereby the hub of said gear will be held against said collar, a sleeve on the adjoining ends of the hubs of said gears, said sleeve bridging the joint between the sections of the rear axle, pinions carried by said sleeve and meshing with the gears on the rear axle, a yoke connected to said pinions, and a gear carried by said yoke and meshing with the gear on the longitudinal shaft.

11. A driving mechanism comprising a longitudinally extending driven shaft, a gear on the rear end thereof, a two-part rear axle, a gear on each of the adjoining ends of said axle parts, said gears facing each other and being provided with long hubs, a rigid collar on each of said axle parts against which the outer ends on the hubs of the gears bear, a retaining cap on each axle part embracing the rigid collar and connected to the hub of the gear, a sleeve on the adjoining ends of the hub of the gears on the axle parts, said sleeve bridging the joint between said axle parts, pinions carried by said sleeve and meshing with the gears on the axle parts, a yoke connected to said sleeve, a gear carried by said yoke and meshing with the gear on the longitudinally extending driven shaft.

12. A driving mechanism comprising a longitudinally extending driven shaft, a gear on the rear end thereof, a two-part rear axle, a gear on each of the adjoining ends of said axle parts, said gears facing each other and being provided with long hubs, a rigid collar on each of said axle parts against which the outer ends of the hubs of the gears bear, a retaining cap on each axle part embracing the rigid collar and connected to the hub of the gear, a sleeve on the adjoining ends of the hub of the gears on the axle parts, said sleeve bridging the joint between said axle parts, pinions carried by said sleeve and meshing with the gears on the axle parts, a yoke connected to said sleeve, a gear carried by said yoke and meshing with the gear on the longitudinally extending driven shaft, a two-part protecting casing for said rear axle, each of said parts being formed with enlarged chambers at its ends, roller bearings in each of said chambers, a gear case connected to the adjoining end of the said axle protecting casing and surrounding the gears connected to said axle parts, a forward projecting shaft support connected to said casing, said shaft support being formed with an enlarged chamber and roller bearings in said chamber for the longitudinal shaft.

In testimony whereof I hereunto affix my signature in the presence of two witnesses this 18 day of January 1907.

JOHN W. LAMBERT

Witnesses:
  GUS. A. EITELMANN,
  GLAD. S. KING